C. T. HENDERSON & C. H. MILLER.
AUTOMATIC MOTOR STARTER.
APPLICATION FILED JAN. 7, 1905.

921,398.

Patented May 11, 1909.

Witnesses:

Inventors.
Clark T. Henderson
Chas. H. Miller
By
Attorneys

C. T. HENDERSON & C. H. MILLER.
AUTOMATIC MOTOR STARTER.
APPLICATION FILED JAN. 7, 1905.
921,398.
Patented May 11, 1909.
2 SHEETS—SHEET 2.
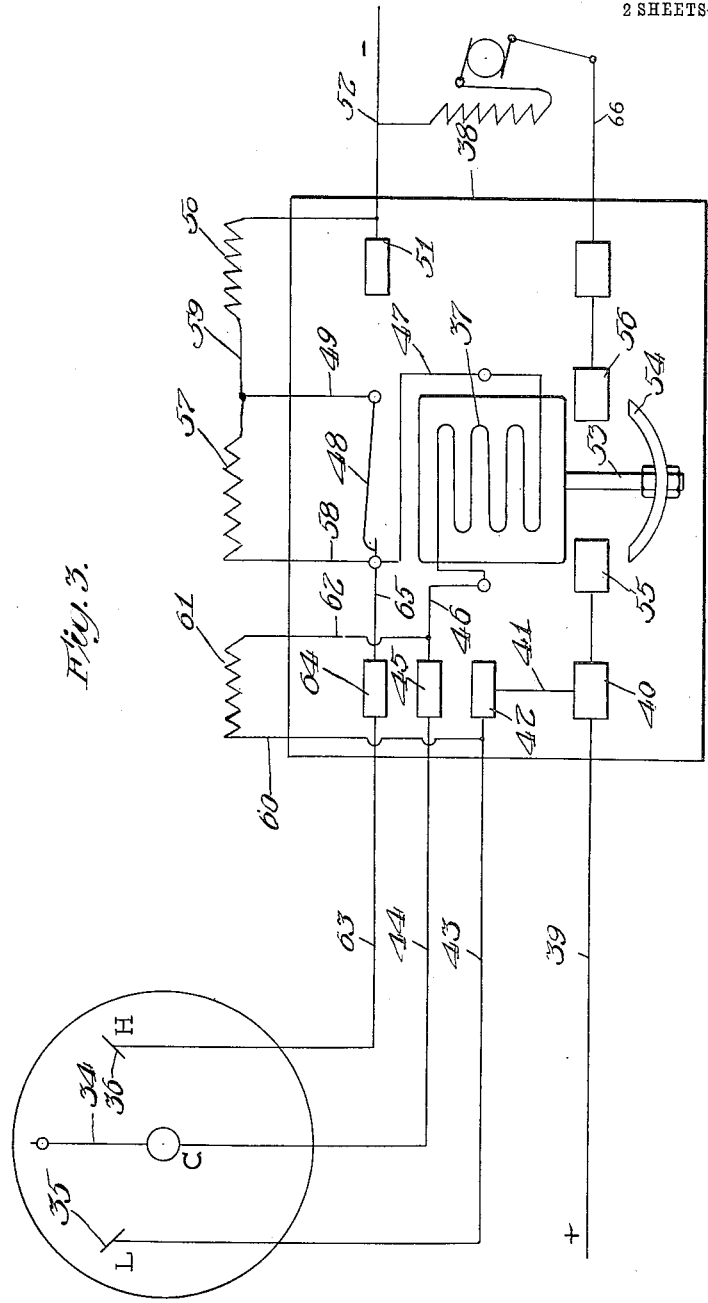
Witnesses:
Robert H. Weir
W. Perry Hahn
Inventors:
Clark T. Henderson & Chas. H. Miller
By: Jones Addington
Attorneys

UNITED STATES PATENT OFFICE.

CLARK T. HENDERSON AND CHARLES H. MILLER, OF MILWAUKEE, WISCONSIN.

AUTOMATIC MOTOR-STARTER.

No. 921,398.　　　Specification of Letters Patent.　　　Patented May 11, 1909.

Application filed January 7, 1905. Serial No. 240,107.

*To all whom it may concern:*

Be it known that we, CLARK T. HENDERSON and CHARLES H. MILLER, citizens of the United States, residing at Milwaukee, in the county of Milwaukee and State of Wisconsin, have invented new and useful Improvements in Automatic Motor - Starters, of which the following is a full, clear, concise, and exact description, reference being had to the accompanying drawing, forming a part of this specification.

Our invention relates to improvements in electrically operated switches, our object being to provide an automatically operated device which may be used to close the circuit for starting electric motors, or in any position where it is desirable to close an electric circuit by means of an electrically operated switch.

A further object of our invention is to provide an automatically controlled switch which may be operated by the variations in pressure in a fluid pressure tank or reservoir.

Figure 1:
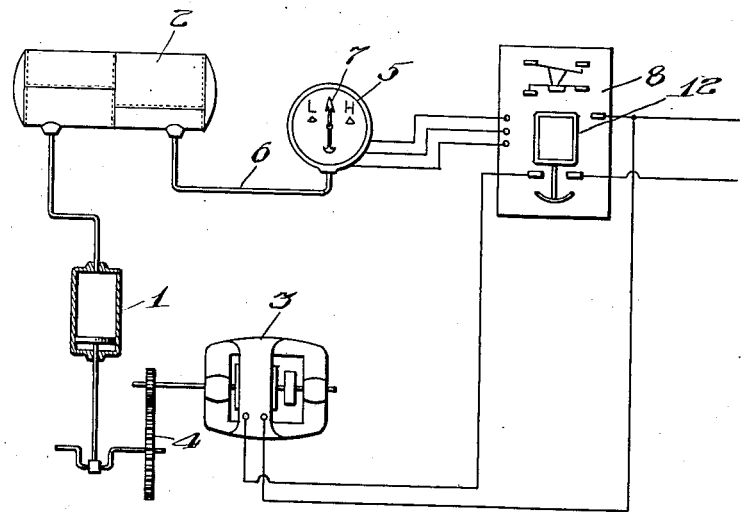
Figure 2:
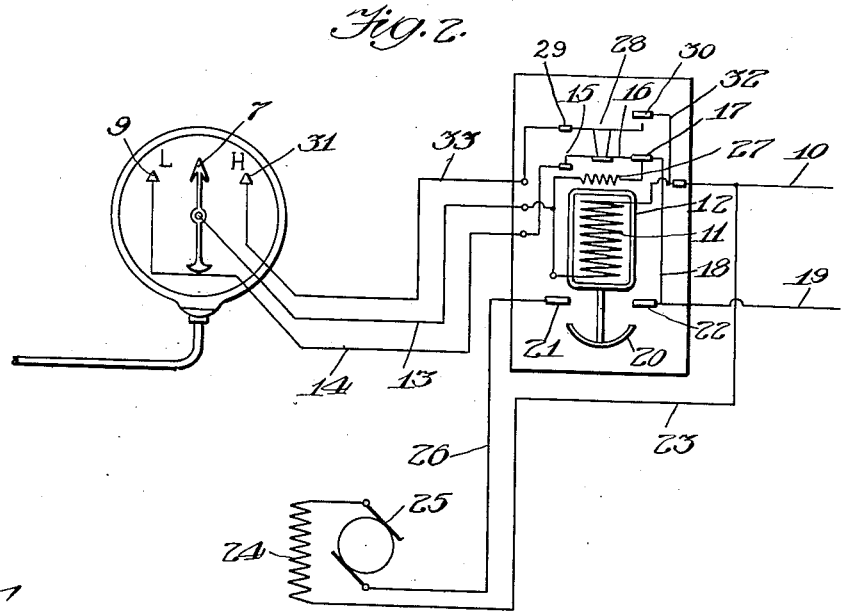

In the drawings showing the preferred embodiment of our invention, Figure 1 is a view showing our invention in connection with a device for supplying compressed air; Fig. 2 is a diagrammatic view showing the circuit arrangement for the same; and, Fig. 3 is a diagrammatic view showing the circuit arrangement of a modification.

In the preferred embodiment of our invention, a suitable compressor 1 is provided for compressing air in a tank or reservoir 2, from which pressure may be supplied, for any suitable purpose, as for air brakes or other suitable devices. The compressor may be connected with the motor 3, in any desired manner, although I have shown in the drawings a series of gears 4, for connecting the same with the motor, and as the compressor is operated by the motor, the pressure in the tank will be supplied as needed.

The operation of the motor is controlled by a pressure regulator 5, which is provided with a Bourbon tube receiving pressure from the tank 2 through the pipe 6, and operating a switch arm 7 for controlling the electrically operated switch 8. This electrically operated switch is suitably operated to close or open the circuit to the motor.

In operation, when the pressure in the reservoir decreases to a predetermined degree, the switch arm 7 of the pressure regulator will engage a contact 9, thereby closing a circuit for the current from the opposite side 10 of the main line through the winding 11 of the solenoid 12 of the electrically operated switch 8, through the conductor 13, switch arm 7, contact 9, thence by conductor 14 to the terminal 15, across the bridge 16 to the terminal 17, and thence by conductor 18 to the opposite side 19 of the main. The current passing through the winding 11 will energize the same, and the core thereof will be attracted, thereby operating the contact 20 to bridge the terminals 21 and 22 which will close the motor circuit and the compressor will be operated to increase the supply of fluid pressure in the tank. The motor circuit may be readily traced from the main 10 by conductor 23, through the series field winding 24, and the armature 25 of the motor, thence by conductor 26 to terminal 21, across the bridge 20, to terminal 22 and from thence to the opposite side 19 of the main.

When the solenoid switch is operated to close the motor circuit, its plunger raises the bridge 16 to break circuit between the terminals 15 and 17, thereby inserting a resistance 27 in circuit in series with the winding 11 of the solenoid 12. With the resistance 27 in circuit, the solenoid winding 11 will be protected against excessive currents, and sparking will be prevented when the contact arm 7 leaves the contact 9. Upon the opening of the switch 16, the switch contact 28 will be caused to bridge the terminals 29 and 30. When the pressure in the tank 2 has reached a predetermined point, the contact arm 7 will be moved into engagement with the contact 31, and the solenoid winding 11 will be short circuited. The circuit in this instance being traced from the main 10 by conductor 32, to the terminal 30, across the bridge contact 28, to terminal 29, and thence by conductor 33 to contact 31, through the switch arm 7, to conductor 13, through the resistance 27, and to the terminal 17 and from thence by conductor 18 to the opposite side 19 of the main. The short circuiting of the winding 11 will deënergize the same, causing it to drop its core, thereby opening the circuit at the terminals 21 and 22, through the motor, and cause the same to cease to operate until the pressure in the reservoir 2 again falls to such a point that the contact arm 7 engages the contact 9, to close the circuit previously mentioned.

It will be noted that as long as the contact arm 7 is in a position between the points 9 and 31, there will be current flowing through the solenoid winding 11, from the main 10, through the winding, through the resistance 27, to contact 17, and thence by conductor 18 to the opposite main 19. The insertion of the resistance 27 however, so reduces the current traversing the winding and the same will not operate to close the contact 20, until the contact arm 7 engages contact 9, thereby closing a shunt circuit around said resistance.

In Fig. 3 we have shown a modification of our device in which the switch 28 has been eliminated. We have not shown in this figure the device as being connected with a motor, or other device, as such connection is fully understood, and it is not considered necessary to show the same herein. In the operation of this form the contact arm 34 is adapted to make contact with either the terminal 35 to close a shunt circuit around the resistance 61, or with the contact 36 to short circuit the winding 37 of an electrically operated switch 38. In the operation of this modification, as shown diagrammatically in Fig. 3, it will be assumed that the pressure in the tank has fallen below a predetermined amount. The contact 34 therefore will move until it has engaged the terminal 35 closing a shunt circuit around the resistance 61. This circuit may be traced as follows: From the main 39 to the binding post 40, by conductor 41, to the binding post 42, thence by conductor 43 to contact 35, across the contact arm 34 by conductor 44, to the terminal 45, thence by conductor 46, through the solenoid winding 37, by conductor 47, across the lamp switch 48, and thence by conductors 49 through the lamp resistance 50 to the binding post 51, which is connected with the opposite main 52 which may be connected in the motor circuit or for the purpose of this invention, the opposite side of the line. The resistance 61 being thus short circuited, sufficient current traverses the winding 37 to cause the same to attract its core 53 and operate the contact 54 to bridge the terminals 55 and 56, and thereby close the motor or other circuit. As the contact 54 bridges the terminals 55 and 56, the lamp switch 48 is opened by the movement of the core 53 thereagainst, inserting the lamp 57 in circuit with the solenoid winding 37, this circuit being traced from the conductor 47 through the conductor 58 through the lamp 57 and thence by conductor 59 to the lamp resistance 50, as previously described. As the pressure in the reservoir increases, the contact arm 34 will gradually move away from the terminal 35 and finally make contact with the terminal 36 which will short circuit the solenoid winding 37, and permit its core to drop opening the motor circuit and causing the compressor to stop. This short circuit may be traced from the main 39 to terminal 40, conductor 41, terminal 42, conductor 60, through the lamp resistance 61, by conductors 62 to terminal 45, and thence by conductor 44 to the movable contact arm 34, terminal 36, conductor 63 terminal 64, conductor 65, and thence by conductor 58 through the resistances 57 and 50 to the opposite side 52 of the main. As soon as the contact 34 has moved away from the terminal 35, when the pressure begins to increase, after the starting of the motor, it is evident that the circuit will be broken at this point so that the circuit can no longer traverse this path, but will take a new path through the conductor 60, lamp resistance 61, conductor 62, and through the solenoid 37, as has been previously described.

Having thus described our invention what we claim as new and desire to secure by Letters Patent is:

1. In a motor controller, the combination with an electromagnetically operated main switch, of a resistance arranged in circuit with the operating winding of said switch for rendering said winding ineffective to close said switch, and an automatically operated switch adapted, when in one position, to close a shunt-circuit around said resistance, and when in another position to cause the deënergization of said winding, said resistance being connected in a circuit for maintaining said winding energized to hold said main switch closed when said automatically operated switch is in an intermediate position.

2. In a motor controller, the combination with an electromagnetically operated main switch, of a resistance arranged in circuit with the operating winding of said switch for rendering said winding ineffective to close said switch, and a fluid pressure operated switch adapted, when in one position, to close a shunt-circuit around said resistance and when in another position to cause the deënergization of said winding, said resistance being connected in a circuit for maintaining said winding energized to hold said main switch closed when said pressure operated switch is in an intermediate position.

3. In a motor controller, the combination with an electromagnetically operated main switch, of a resistance connected in circuit with the operating winding of said switch for rendering said winding ineffective to close said switch, and a pressure operated switch arranged to move between stops and adapted, when in contact with one of said stops, to close a shunt-circuit around said resistance and when in contact with the other of said stops to cause the deënergization of said winding, said resistance being connected in a circuit for maintaining said winding energized to hold said main switch closed when said pressure operated switch is in an intermediate position between said stops.

4. In a motor controller, the combination with an electromagnetically operated main switch, of a resistance arranged in the circuit of the operating winding of said switch for rendering said winding ineffective to close said switch, and an automatically operated switch adapted, when in one position, to close a shunt-circuit around said resistance, and when in another position to close a shunt-circuit around said operating winding to cause said main switch to open, said resistance being connected in a circuit for maintaining said winding energized to hold said main switch closed when said automatically operated switch is in an intermediate position.

5. In a motor controller, the combination with an electromagnetically operated main switch, of a resistance arranged in circuit with the operating winding of said switch for rendering said winding ineffective to close said switch, and a pressure actuated switch adapted, when in one position, to close a shunt-circuit around said resistance and when in another position to close a shunt-circuit around said operating winding to cause said main switch to open, said resistance being connected in a circuit for maintaining said winding energized to hold said main switch closed while said pressure operated switch is in an intermediate position.

6. In a motor controller, the combination with an electromagnetically operated main switch, of a resistance connected in circuit with the operating winding of said switch for rendering said winding ineffective to close said switch, a normally open shunt-circuit around said resistance, an automatically operated switch adapted, when in one position, to close said shunt-circuit around said resistance and when in another position to render said winding ineffective to hold said switch closed, and means operated upon the closure of said main switch for opening said shunt-circuit around said resistance, said resistance being connected in a maintaining circuit for rendering said winding effective to hold said main switch closed.

7. In a motor controller, the combination with an electromagnetically operated main switch, of a resistance connected in circuit with the operating winding of said switch for rendering said winding ineffective to close said switch, a normally open shunt-circuit around said resistance, a pressure operated switch movable between stops and adapted, when in engagement with one of said stops, to close said shunt-circuit around said resistance, a switch operated upon the closure of said main switch for opening said shunt-circuit around said resistance, said resistance being connected in a maintaining circuit for said winding.

8. In a motor controller, the combination with an electromagnetically operated main switch, a resistance arranged in circuit with the operating winding of said switch for rendering said winding ineffective to close said switch, a normally open shunt-circuit around said resistance, a normally open shunt-circuit around said winding, an automatic switch adapted, when in one position, to close one of said shunt-circuits and when in another position to close the other of said shunt-circuits, said resistance establishing a maintaining circuit for said winding, and a switch connected in each of said shunt-circuits and adapted to be actuated upon the closure of said main switch.

9. In a motor controller, the combination with an electromagnetically operated main switch, a resistance arranged in circuit with the operating winding of said switch for rendering said winding ineffective to close said switch, a normally open shunt-circuit around said resistance, a normally open shunt-circuit around said winding, and a pressure operated switch adapted, when in one position, to close one of said shunt-circuits and when in another position to close the other of said shunt-circuits, said resistance forming a maintaining circuit for said winding, and a switch connected in each of said shunt-circuits, one of said last mentioned switches being arranged to be opened and the other closed when said main switch is closed.

10. The combination with a magnetically operated switch, of means for reducing the current traversing the operating magnet of said switch, a device responsive to fluid pressure which in one position renders said means ineffective and in another position closes a shunt circuit around said magnet, and a switch in said circuit adapted to be closed when said magnet is operated.

11. The combination with a magnetically operated switch, of a resistance arranged in the circuit of the operating magnet of said switch, a shunt extending around said resistance, a fluid pressure operated switch which in one position closes said shunt and in another position closes a shunt circuit around said magnet, and a normally opened switch in said second mentioned shunt circuit adapted to be closed when said magnet is operated.

12. The combination with a magnetically operated switch, of means for reducing the current traversing the operating magnet of said switch, a switch which in one position renders said means ineffective and in another position closes a shunt circuit around said magnet, and a normally opened switch in said shunt circuit adapted to be closed when said magnet is operated.

13. The combination with a magnetically operated switch, of a resistance external to said switch and normally in series with the winding of the magnet for said switch to render said magnet inoperative, a normally open low-resistance shunt circuit around said resistance, a normally open low resistance shunt circuit around said magnet, means for automatically closing said shunt circuit around the resistance under predetermined conditions to render said magnet operative to close said switch and means connected with said switch for introducing when operated a resistance in series with the winding of said switch magnet.

14. The combination with a magnetically operated switch, of a resistance external to said switch and normally in series with the winding of the magnet for said switch to render said magnet inoperative, a normally open low-resistance shunt circuit around said resistance, a normally open low resistance shunt circuit around said magnet, means for automatically closing said shunt circuit around the resistance under predetermined conditions to render said switch magnet operative to close said switch, means connected with said switch for introducing when operated a resistance in series with the magnet and for closing a switch in the shunt circuit around said magnet, and means for automatically closing under predetermined conditions, the shunt circuit around said switch magnet, whereby said switch is opened.

In witness whereof, we have hereunto subscribed our names in the presence of two witnesses.

CLARK T. HENDERSON.
CHARLES H. MILLER.

Witnesses:
HENRY H. CUTLER,
J. F. HAWKINS.